(12) United States Patent
Varela

(10) Patent No.: US 6,991,379 B2
(45) Date of Patent: Jan. 31, 2006

(54) KING PIN SEAL ASSEMBLY

(75) Inventor: Tomaz Dopico Varela, Gahanna, OH (US)

(73) Assignee: ArvinMeritor Technology LLC, Troy, MI (US)

( * ) Notice: Subject to any disclaimer, the term of this patent is extended or adjusted under 35 U.S.C. 154(b) by 5 days.

(21) Appl. No.: 10/683,082

(22) Filed: Oct. 10, 2003

(65) Prior Publication Data

US 2005/0078898 A1 Apr. 14, 2005

(51) Int. Cl.
*F16C 33/78* (2006.01)

(52) U.S. Cl. ..................... 384/486; 384/571
(58) Field of Classification Search ............... 384/486, 384/484, 551, 571, 563
See application file for complete search history.

(56) References Cited

U.S. PATENT DOCUMENTS

| | | | | |
|---|---|---|---|---|
| 5,017,025 A | * | 5/1991 | Williams | .................... 384/571 |
| 5,292,199 A | * | 3/1994 | Hosbach et al. | ............ 384/478 |
| 5,511,886 A | * | 4/1996 | Sink | .......................... 277/559 |

FOREIGN PATENT DOCUMENTS

| | | |
|---|---|---|
| DE | 101 52 585 A1 | 10/2002 |
| DE | 102 27 113 A1 | 2/2003 |
| DE | 103 09 852 A1 | 10/2003 |
| DE | 103 10 444 A1 | 10/2003 |
| EP | 0 854 817 B | 12/2001 |
| EP | 0 973 670 B | 7/2002 |

OTHER PUBLICATIONS

European Search Report, dated Jun. 1, 2005.

* cited by examiner

*Primary Examiner*—Lenard A. Footland
(74) *Attorney, Agent, or Firm*—Carlson, Gaskey & Olds

(57) ABSTRACT

A seal assembly includes a protective shield, a seal and a seal wiper. A garter spring is located about the outer perimeter of the seal to provide a constricting force around the seal to assure that the lips contact the seal wiper even after deformation and wear of the seal assembly. Another seal assembly includes an integrally shielded seal manufactured of a non-metallic material.

6 Claims, 3 Drawing Sheets

KING PIN SEAL ASSEMBLY

BACKGROUND OF THE INVENTION

The present invention relates to a steering knuckle and, more particularly, to a king pin seal assembly therefor.

Heavy-duty vehicles commonly include multiple drive axle assemblies and non-drive steering axles. A wheel end assembly is supported on a steering knuckle, which is supported on an axle assembly. The steering knuckle pivots upon a king pin to provide steering. Conventional king pin arrangements usually include a combination of bushings and thrust bearings.

King pin bearings and bushings are high wear components that typically require replacement every few hundred thousand miles. Frequent maintenance such as re-greasing to flush out wear particles and contamination may also be regularly required. Typically, one or more seals are located about the king pin to minimize contamination of the king pin bearings.

Over time, conventional king pin arrangements may develop some level of end play which may detrimentally affect king pin seals resulting in increased wear and further exacerbation of end play. Due to this wear, conventional king pin seals may provide reduced seal contact. This may be at least partially alleviated by more frequent lubrications to purge contamination and maintain a barrier against moisture and solid contamination. However, if such increased maintenance is not continually performed, the grease barrier may degrade and damage the bushings/bearings.

This situation may be further complicated when the king pin arrangements utilize taper roller bearings on a lower portion of the king pin. Seals on the lower end of king pin tend to accumulate water and contamination on top of the seal lips, which may cause accelerated wear and allow contamination infiltration of the bearing cavity.

Accordingly, it is desirable to provide an effective king pin seal assembly which provides long life with minimal maintenance.

SUMMARY OF THE INVENTION

A seal assembly according to the present invention includes a protective shield, a seal and a seal wiper. The protective shield is L-shaped such that a vertical portion is parallel to the king pin axis. The seal wiper is generally step-shaped in cross section. The seal extends from the protective shield and contacts the seal wiper along a multiple of seal lips. A garter spring is located about the outer perimeter of the seal to provide a constricting force around the seal to assure that the lips contact the seal wiper even after deformation and wear of the seal assembly.

Another seal assembly includes an integrally shielded seal manufactured of a non-metallic material.

The present invention therefore provide an effective king pin seal assembly having a long life with minimal maintenance.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
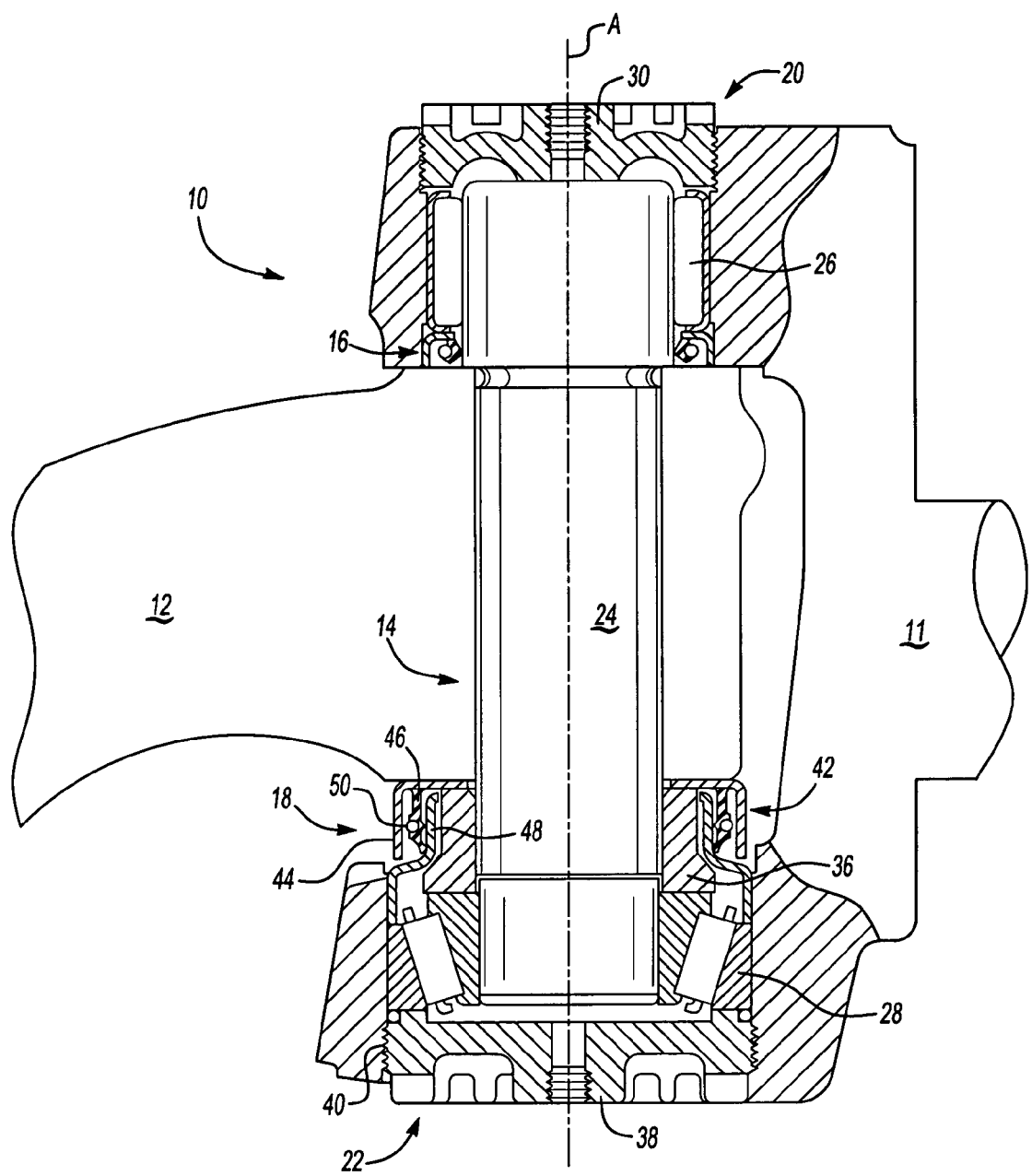
FIG. 1 is a partial cross-sectional view of a seal assembly for a front axle steering knuckle assembly.

FIG. 1 illustrates a general perspective view of a steering knuckle assembly 10. The steering knuckle assembly 10 includes a support structure such as a knuckle 11 mounted to an axle beam 12 (illustrated schematically) through a king pin arrangement 14 for rotation about an axis A. It is to be understood that the axle beam 12 may be any suitable vehicle support structure.

The knuckle 11 includes upper 16 and lower 18 cavities on opposing portions of the knuckle 11. It should be understood that relative positional terms such as "forward," "aft," "upper," "lower," "above," "below," and the like are with reference to the normal operational attitude of the vehicle and should not be considered otherwise limiting. The cavities 16, 18 are preferably cylindrical threaded bores, however, other cavities and receipt members will come within the scope of the present invention. The cavities 16, 18 receive an upper king pin mount 20 and a lower king pin mount 22 to retain a king pin 24.

The upper cavity 16 retains a needle bearing 26 for rotation about the king pin 24. The lower cavity 18 retains a tapered roller bearing 28 for rotation of the king pin 24 therein. A spring cap 30 is preferably threaded into the upper cavity 16 which includes corresponding threads 32. The spring cap 30 preloads the tapered roller bearing 28 which greatly reduces end play that may otherwise reduce seal life. It should be understood that other mechanical locks, shims, spacers and other methods may alternatively or additionally be used to adjust bearing pre-load.

A spacer 36 is preferably mounted between tapered roller bearing 28 and the axle beam 12. An adjustment nut 38 is threaded into the lower cavity 18, which includes corresponding threads 40. Positioning of the spring cap 30 and the adjustment nut 38 permits application and adjustment of the preload to the king pin 24.

Figure 2:
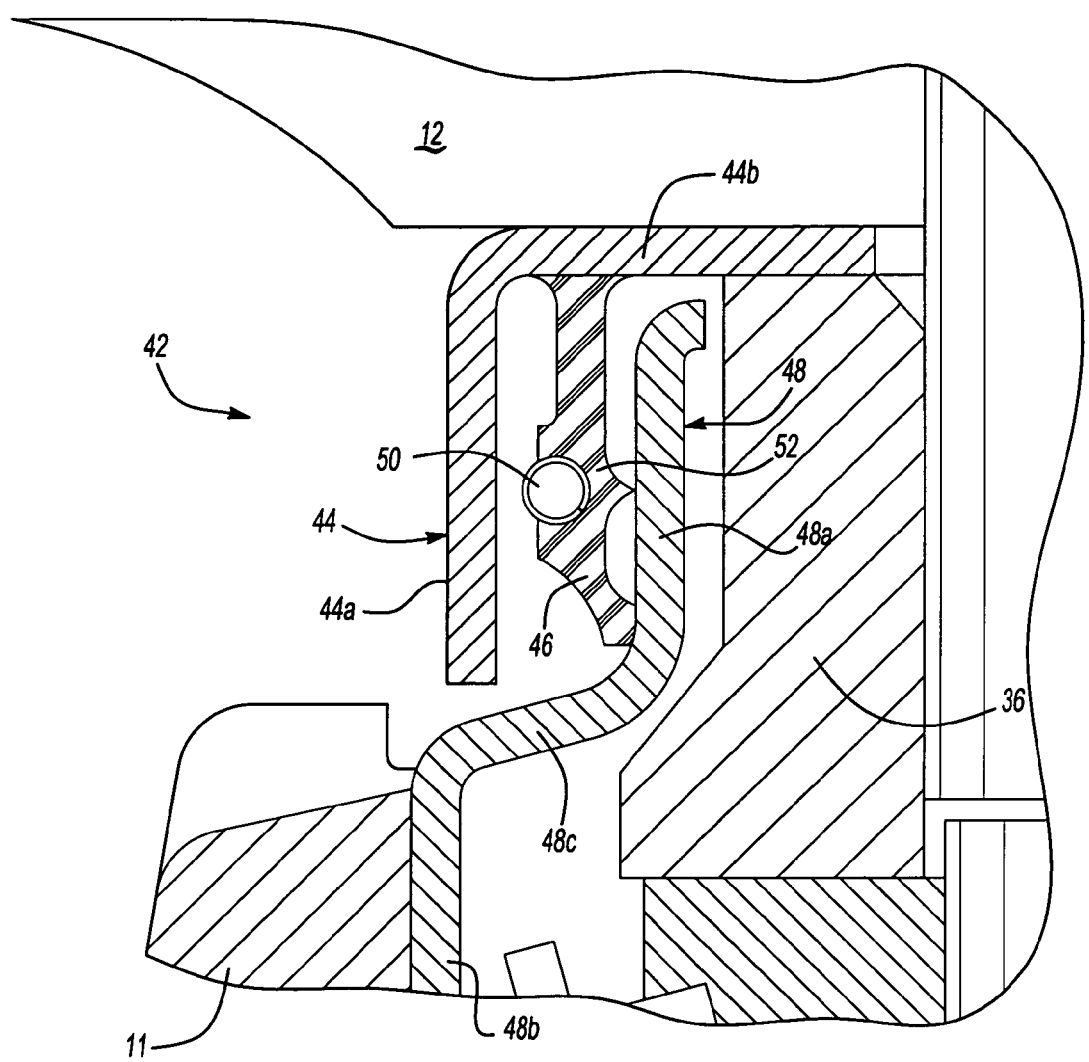
FIG. 2 is an exploded partial cross-sectional view of a seal assembly according to the present invention.

A seal assembly 42 is preferably located about the spacer 36 adjacent the lower cavity 18 to seal and protect the tapered roller bearing 28. The seal assembly 42 includes a protective shield 44, a seal 46 and a seal wiper 48. Preferably, a garter spring 50 is located about the outer perimeter of the seal 46 (FIG. 2). Although the seal assembly 42 protects a tapered roller bearings in the illustrated embodiment, it should be understood that other applications will likewise benefit from the inventive seal disclosed herein.

Referring to FIG. 2, the protective shield 44 is preferably L-shaped such that a vertical portion 44a parallels axis A and overlaps the seal 46. That is, the vertical portion 44a shields the seal 46 from mechanical damage caused by road debris and the like while a horizontal portion 44b is retained between the spacer 36 and the axle beam 12. The seal wiper 48 is generally step-shaped in cross section. That is, first and a second vertical portions 48a, 48b are interconnected by a generally horizontal portion 48c. The protective shield 44 and the seal wiper 48 are preferably manufactured of metal, however, a substantially non-metallic assembly 42' (FIG. 3) can also be utilized with the present invention.

The seal 46 extends from the protective shield 44 and contacts the first vertical portion 48a of the seal wiper 48 along a multiple of seal lips 52. The garter spring 50 is located about the outer perimeter of the seal 46. The garter spring 50 provides a constricting force around the seal 46 toward axis A to assure that lip 52 contacts the seal wiper 48a even after deformation and wear of the seal assembly 42 which may develop over time.

Figure 3:
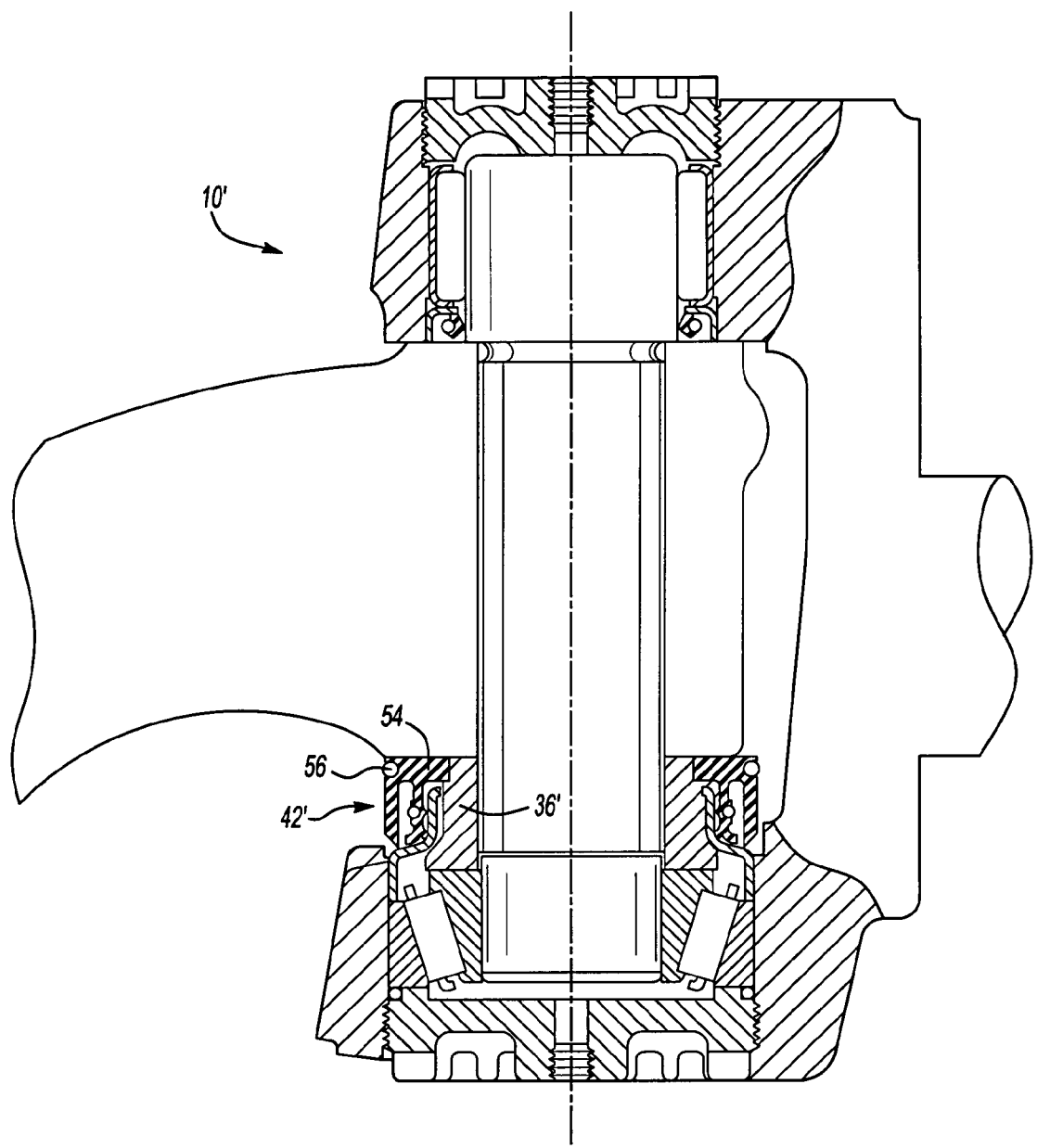
FIG. 3 is a partial cross-sectional view of another seal assembly for a front axle steering knuckle assembly.

Referring to FIG. 3, substantially non-metallic assembly 42' includes an integrally shielded seal 54. The integrally shielded seal 54 is manufactured of a non-metallic material and is retained by a wire ring 56 which surrounds the outer diameter of the seal 54. The wire ring 56 constricts the seal 54 onto the spacer 36'. It should be understood that other retainers can be utilized with the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A king pin arrangement comprising:
    a support structure comprising an upper cavity and a lower cavity;
    a needle bearing within said upper cavity;
    a tapered roller bearing within said lower cavity;
    a king pin mounted within said needle bearing and said tapered roller bearing for rotation about an axis;
    a spacer mounted about said king pin;
    a protective shield adjacent said support structure and said spacer;
    a seal wiper adjacent said spacer;
    a seal engaged with said protective shield and said seal wiper; and
    a garter spring located about an outer perimeter of said seal to pressure said seal toward said seal wiper.

2. The king pin arrangement as recited in claim 1, wherein said protective shield extends between said support structure and said spacer.

3. The king pin arrangement as recited in claim 2, wherein said protective shield is substantially L-shaped.

4. The king pin arrangement as recited in claim 1, wherein said seal wiper is substantially step-shaped a first vertical portion of said seal wiper located adjacent said spacer and a second vertical portion located adjacent a knuckle.

5. The king pin arrangement as recited in claim 1, wherein said protective shield and said shield are integral.

6. The king pin arrangement as recited in claim 5, further comprising a wire retainer about said protective shield.

* * * * *